US008867508B2

(12) United States Patent
Forbes et al.

(10) Patent No.: US 8,867,508 B2
(45) Date of Patent: Oct. 21, 2014

(54) METHOD AND SYSTEM FOR WIRELESS ACCESS POINT RADIOS INTEGRATED IN A CABLE

(75) Inventors: Marcellus Forbes, San Francisco, CA (US); Mark Gonikberg, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 304 days.

(21) Appl. No.: 12/984,949

(22) Filed: Jan. 5, 2011

(65) Prior Publication Data
US 2012/0170558 A1    Jul. 5, 2012

(51) Int. Cl.
*H04W 4/00* (2009.01)
*H04W 88/08* (2009.01)
*H04W 24/04* (2009.01)

(52) U.S. Cl.
CPC .............. *H04W 88/08* (2013.01); *H04W 24/04* (2013.01)
USPC ........................................................ 370/338

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497
See application file for complete search history.

(56) References Cited

U.S. PATENT DOCUMENTS

| | | | | |
|---|---|---|---|---|
| 5,809,429 A | * | 9/1998 | Knop et al. | 455/523 |
| 6,140,911 A | * | 10/2000 | Fisher et al. | 375/258 |
| 7,231,224 B1 | * | 6/2007 | Chesson | 455/523 |
| 2004/0001467 A1 | * | 1/2004 | Cromer et al. | 370/338 |
| 2006/0034235 A1 | * | 2/2006 | Yamane | 370/338 |
| 2009/0252348 A1 | * | 10/2009 | Glissman | 381/107 |
| 2010/0224328 A1 | * | 9/2010 | Utaka et al. | 156/378 |
| 2011/0269404 A1 | * | 11/2011 | Hu et al. | 455/67.11 |
| 2013/0022350 A1 | * | 1/2013 | Kozischek et al. | 398/10 |

FOREIGN PATENT DOCUMENTS

| | | |
|---|---|---|
| GB | 2 402 023 B | 9/2005 |
| JP | 2005192059 A | 7/2005 |
| KR | 10-2007-0065909 A | 6/2007 |
| WO | 2006044192 A2 | 4/2006 |

OTHER PUBLICATIONS

European Search Report for EP11009947.0 dated Mar. 30, 2012, 3 pages.

* cited by examiner

*Primary Examiner* — Jung-Jen Liu
(74) *Attorney, Agent, or Firm* — Garlick & Markison; Bruce E. Garlick (57) ABSTRACT

A wireless access point (AP) radio may be integrated in a cable. The cable may comprise one or more other integrated wireless AP radios. The cable may be communicatively coupled to a wireless controller and the wireless AP radio may receive power from the wireless controller via the cable. Feature information and/or configuration parameter settings may be received by the wireless AP radio from the wireless controller via the cable. The wireless AP radio may provide wireless communication services such as wireless access to a wired network for one or more client devices, based on the feature information and/or the configuration parameter settings. When one or more adjacent wireless AP radios in the cable become non-operational, the wireless AP radio may increase its transmission power to increase its coverage for covering at least a portion of coverage area associated with the one or more non-operational adjacent wireless AP radios.

20 Claims, 5 Drawing Sheets

METHOD AND SYSTEM FOR WIRELESS ACCESS POINT RADIOS INTEGRATED IN A CABLE

CROSS-REFERENCE TO RELATED APPLICATIONS/INCORPORATION BY REFERENCE

[Not applicable]

FIELD OF THE INVENTION

Certain embodiments of the invention relate to communication systems. More specifically, certain embodiments of the invention relate to a method and system for wireless access point radios integrated in a cable.

BACKGROUND OF THE INVENTION

A wireless access point (AP) is a primary network access device of a wireless network such as a wireless local area network (LAN). The wireless AP enables one or more wireless communication devices to access the wireless LAN using exemplary wireless communication standards such as WiFi, Bluetooth, 60 GHz, ZigBee and/or picocell cellular. Wireless APs are operable to support one or more wireless communication standards for sending and receiving data utilizing radio frequencies (RF) rather than cabling. For example, wireless APs may use standards defined by IEEE such as IEEE 802.11 standards.

In an enterprise or corporate environment, several wireless APs may be communicatively coupled to a wired network such as a wired local area network (LAN), thereby providing wireless access to the wired network. A wireless AP may also be used in a home wireless network for connecting wireless enabled computers and/or other wireless communication devices in a home. In such instances, the wireless AP may be integrated in a wireless router which may include the wireless AP, a router, an Ethernet switch and/or a broadband modem.

In an area such as in an unban area, the density of wireless APs may be high, and the same industrial, scientific and medical (ISM) spectrum may be shared by hundreds of wireless APs. In this regard, the higher the density of the wireless APs is, the lesser the bandwidth that may be available to each of the wireless APs.

The actual coverage or range of the wireless AP may vary depending on such variables as indoor or outdoor environment, height above ground, nearby obstructions, interference from other active devices broadcasting on the same frequency, type of antenna, the current weather, operating radio frequency, and/or the power output of the wireless AP.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for wireless access point radios integrated in a cable, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for wireless access point radios integrated in a cable. In various embodiments of the invention, a wireless access point (AP) radio may be integrated in a cable and the cable may comprise one or more other integrated wireless AP radios sharing the cable. The wireless AP radio may comprise one or more wireless transmitters and one or more wireless receivers. The cable may be communicatively coupled to a wireless controller and the wireless AP radio may be operable to receive power from the wireless controller via the cable. Feature information and/or configuration parameter settings may be received by the wireless AP radio from the wireless controller via the cable. The wireless AP radio may be operable to provide wireless access and/or wireless communication services for one or more client devices that are communicatively coupled to the wireless AP radio, based on the received feature information and/or the received configuration parameter settings.

In an exemplary embodiment of the invention, the wireless AP radio may provide access to a wired network for the one or more client devices. The wired network may be connected to the wireless controller. In such instances, the wireless AP radio may receive a data packet having a wireless format from each of the one or more client devices, and transmit the data packet having the wireless format to the wireless controller via the cable. In this regard, the wireless controller may convert the received data packet having the wireless format to generate a data packet having a wired format for transmitting to the wired network. The wireless AP radio may receive a data packet having a wireless format from the wireless controller via the cable, and transmit the data packet having the wireless format to each of the one or more client devices. In this regard, the wireless controller may have converted a data packet having a wired format to generate the data packet having the wireless format after receiving the data packet in the wired format from the wired network.

In an exemplary embodiment of the invention, the wireless controller may identify the wireless AP radio integrated in the cable based on a media access control (MAC) address of the wireless AP radio. Upgraded feature information and/or updated configuration parameter settings may be received by the wireless AP radio from the wireless controller via the cable. The wireless AP radio may be operable to monitor and/or verify operations of one or more adjacent wireless AP radios integrated in the cable. In instances when one or more adjacent wireless AP radios integrated in the cable may become non-operational, the wireless AP radio may increase its transmission power to increase its coverage for covering at least a portion of coverage area associated with the one or more non-operational adjacent wireless AP radios.

One or more new cables that each comprises one or more new wireless AP radios may be added to the cable so as to extend a total coverage area associated with the wireless AP radio and the one or more other wireless AP radios in the cable. In instances when the wireless AP radio integrated in the cable is defective, a section of the cable comprising the wireless AP radio may be replaced by a new cable comprising one or more new wireless AP radios.

Figure 1A:
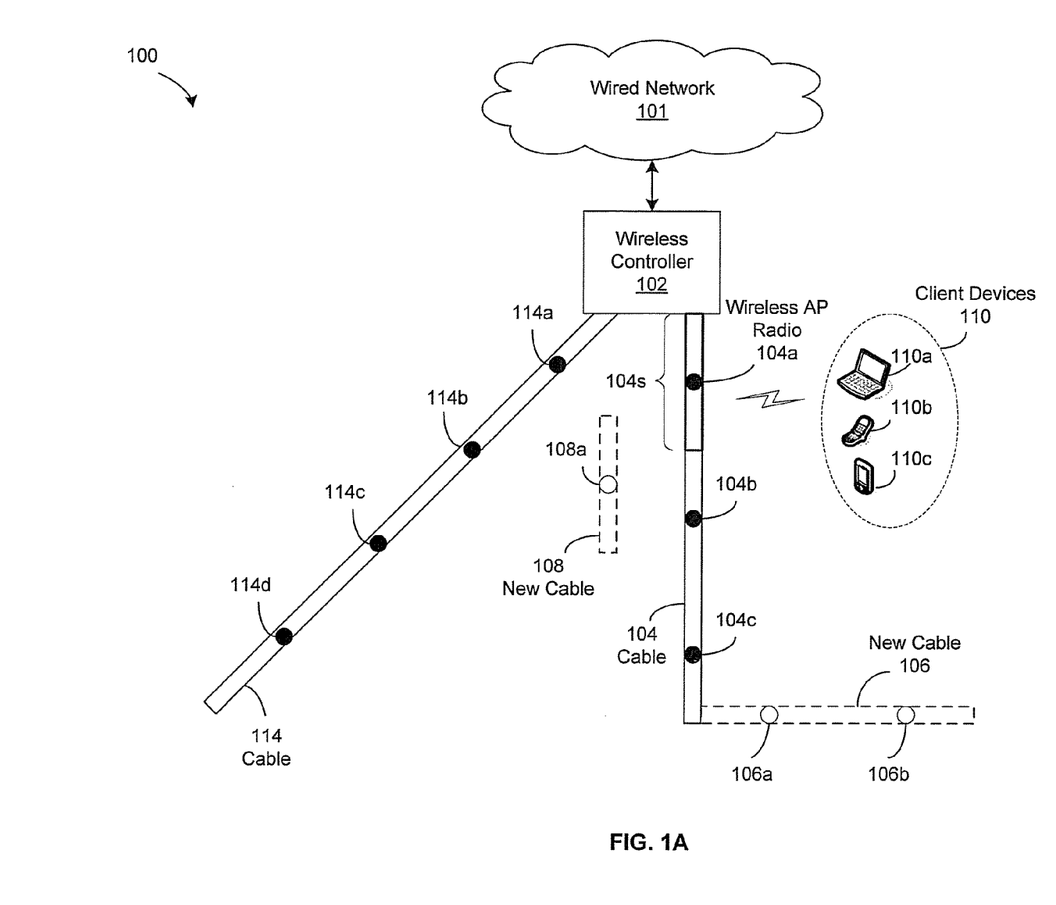
FIG. 1A is a block diagram illustrating an exemplary communication system that is operable to provide wireless access point radios integrated in a cable, in accordance with an embodiment of the invention.

FIG. 1A is a block diagram illustrating an exemplary communication system that is operable to provide wireless access point radios integrated in a cable, in accordance with an embodiment of the invention. Referring to FIG. 1A, there is shown a communication system 100. The communication system may comprise a wired network 101, a wireless controller 102, a plurality of cables, of which cables 104, 114 are illustrated, and a plurality of client devices, of which client devices 110a-110c are illustrated. The client device 110a-110c may be communicatively coupled to the wireless AP radio 104a. The cables 104, 114 may each comprise a plurality of integrated wireless AP radio, of which the wireless AP radios 104a-104c and the wireless AP radios 114a-114d are illustrated, respectively. Each of the wireless AP radios 104a-104c, 114a-114d may be placed apart at a short distance such as at 1-3 meters. The integrated wireless AP radios such as the wireless AP radios 104a-104c may be a set of miniature wireless radios connected together by the cable 104. In this regard, for example, the wireless AP radios 104a-104c may be connected together inside the cable 104. The wireless AP radios 104a-104c may also be connected together by the cable 104 in a Christmas lights structure, for example.

The wired network 101 may comprise suitable logic, circuitry, interfaces, communication devices and/or code that may be operable to provide communication and/or networking services to various devices such as the wireless controller 102 using wired technologies. For example, the wired network 101 may be an Ethernet network which may communicate data packets with the wireless controller 102 using IEEE 802.3 standards.

The wireless controller 102 may comprise suitable logic, circuitry, interfaces and/or code that may be operable to provide management and/or control functionalities to a plurality of wireless AP radios such as the wireless AP radios 104a-104c, 114a-114d, which are communicatively coupled to the wireless controller 102 via the cables 104, 114. In an exemplary embodiment of the invention, the wireless controller 102 may be operable to discover or identify a wireless AP radio such as the wireless AP radio 104a connected to the wireless control 102 via the cable 104. The wireless controller 102 may identify the wireless AP radio 104a based on a MAC address of the wireless AP radio 104a, for example. The wireless controller 102 may provide power such as low voltage DC power to the wireless AP radio 104a via the cable 104. The wireless controller 102 may download feature information and/or configuration parameter settings to the wireless AP radio 104a, via the cable 104. The wireless AP radio 104a may then utilize the feature information and the configuration parameter settings to provide wireless access and/or wireless communication services to the client devices 110a-110c.

Each of the wireless AP radios such as the wireless AP radio 104a may comprise suitable logic, circuitry, interfaces and/or code that may be operable to provide wireless access and/or wireless communication services to one or more communicatively coupled client devices such as the client devices 110. The wireless AP radio 104a may comprise one or more wireless transmitters and one or more wireless receivers. A wireless transmitter and a wireless receiver may be integrated together as a transceiver, for example. In an exemplary embodiment of the invention, the wireless AP radio 104a may be operable to provide, for the one or more client devices 110, wireless access to a wired network such as the wired network 101 which is connected to the connected to the wireless controller 102.

In operation, the wireless AP radio 104a along with other wireless AP radios 104b-104c are integrated in the cable 104. The cable 104 may be connected to the wireless controller 102 and the wireless controller 102 may be communicatively coupled to the wired network 101. The wireless AP radio 104a may receive power such as low voltage DC power from the wireless controller 102 via the cable 104. For example, the low voltage DC power may be received using power over Ethernet (POE). Feature information and/or configuration parameter settings may be downloaded to the wireless AP radio 104a from the wireless controller 102 via the cable 104. The wireless AP radio 104a may be operable to provide wireless access and/or wireless communication services for one or more client devices 110 that are communicatively coupled to the wireless AP radio 104a, based on the received feature information and/or the received configuration parameter settings. In this regard, the wireless AP radio 104a may provide the wireless access and/or wireless communication services using IEEE 802.11 standards, for example. The received feature information may comprise, for example, software and/or firmware that may implement features based on the IEEE 802.11 standards. In an embodiment of the invention, in addition to implementing features based on the IEEE 802.11 standards, the feature information may also comprise enterprise level features such as, for example, security, quality of service and/or other enterprise level management features. The configuration parameter settings may comprise, for example, power level setting, channel setting, security setting and/or other configurable parameter settings.

In an exemplary embodiment of the invention, the wireless AP radio 104a may provide access to the wired network 101 for the one or more client devices 110. The wired network 101 may be connected to the wireless controller 102. To minimize processing and data storage requirements of the wireless AP radio 104a, data packets that are travelling in the cable 104 are the same data packets that are travelling wirelessly over the air. In such instances, the wireless AP radio 104 may receive a data packet having a wireless format from each of the one or more client devices 110 such as the client device 110a, and transmit the data packet having the wireless format to the the wireless controller 102 via the cable 104. The wireless controller 102 may convert the received data packet having the wireless format to generate a data packet having a wired format for transmitting to the wired network 101. In this regard, the data packet having a wireless format may comprise, for example, a data packet in the 802.11 format. The data packet having a wired format may comprise, for example, a data packet in the 802.3 format.

The wired network 101 may transmit a data packet having a wired format such as the 802.3 format to the wireless controller 102. The wireless controller 102 may convert the received data packet having the wired format to generate a data packet having a wireless format such as the 802.11 format. The wireless controller 102 may transmit the data packet having the wireless format such as the 802.11 format to the wireless AP radio 104a via the cable 104. The wireless AP radio 104a may then transmit the received data packet having the wireless format to a communicatively coupled client device such as the client device 110a. In instances when the client device 110a is in a power save mode and is not able to communicate with the wireless AP radio 104a at this time, the wireless controller 102 may hold on to the data packet and not transmit the data packet to the wireless AP radio 104a until the client device 110a is back to an active mode, for example.

In an exemplary embodiment of the invention, the wireless controller 102 may discover or identify the wireless AP radio 104a integrated in the cable 104 based on a unique MAC address of the wireless AP radio 104a. Upgraded feature information and/or updated configuration parameter settings may also be received by the wireless AP radio 104a from the wireless controller 102 via the cable 104. The wireless AP radio 104a may be operable to monitor and/or verify operations of one or more adjacent wireless AP radios such as the wireless AP radio 104b integrated in the cable 104. In instances when one or more adjacent wireless AP radios such as the wireless AP radio 104b may be detected to be non-operational or defective, the wireless AP radio 104a may be instructed by the wireless controller 102 to increase its transmission power to increase its coverage for covering at least a portion of coverage area associated with the one or more non-operational adjacent wireless AP radios such as the wireless AP radio radio 104b. For example, the wireless AP radio 104a may increase its transmission power based on a new or updated power level setting received from the wireless controller 102.

One or more new cables that each comprises one or more new wireless AP radios may be added to the cable 104 so as to extend a total coverage area associated with the wireless AP radios 104a-104c in the cable 104. For example, a new cable such as the new cable 106, which may comprise new wireless AP radios 106a-106b, may be added or connected to the cable 104, using splicing, for extending the total coverage area.

In instances when the wireless AP radio 104a integrated in the cable 104 is defective, a section of the cable 104 comprising the wireless AP radio 104a may be replaced by a new cable comprising one or more new wireless AP radios. For example, a section 104s of the cable 104 may be replaced by a new cable such as the new cable 108 which may comprise a new wireless AP radio 108a.

In the exemplary embodiment of the invention illustrated in FIG. 1A, the wireless AP radio 104a provides wireless access for the client devices 110 to the wired network 101 via the cable 104. Notwithstanding, the invention is not so limited and other wireless communication services may be provided by the wireless AP radio 104a. In this regard, for example, the wireless AP radio 104a along with the other wireless AP radios 104b-104c, 114a-114d may form a mesh network, and a data packet received from the client device 110a may travel via the mesh network over the air until the data packet reaches a destination. Due to the relatively short range coverage provided by the wireless AP radio 104a, the wireless AP radio 104a may be able to provide an accurate location such as an indoor location to the client device 110a for location based services (LBS) applications, for example.

Figure 1B:
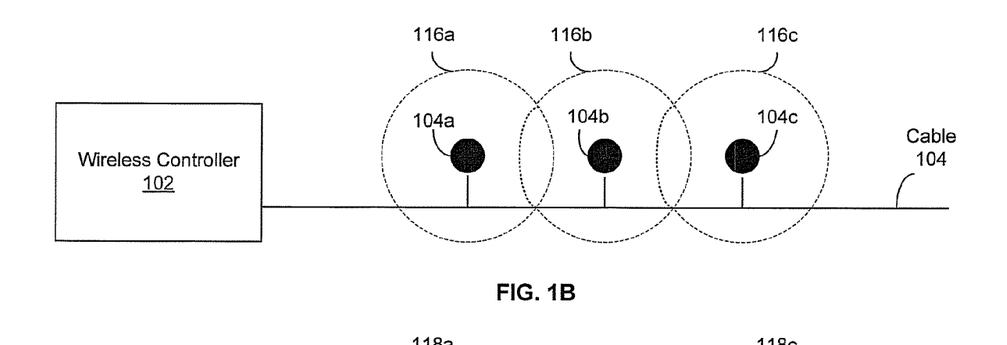
FIGS. 1B-1C are block diagrams that each illustrates exemplary coverage of wireless access point radios integrated in a cable, in accordance with an embodiment of the invention.
Figure 1C:
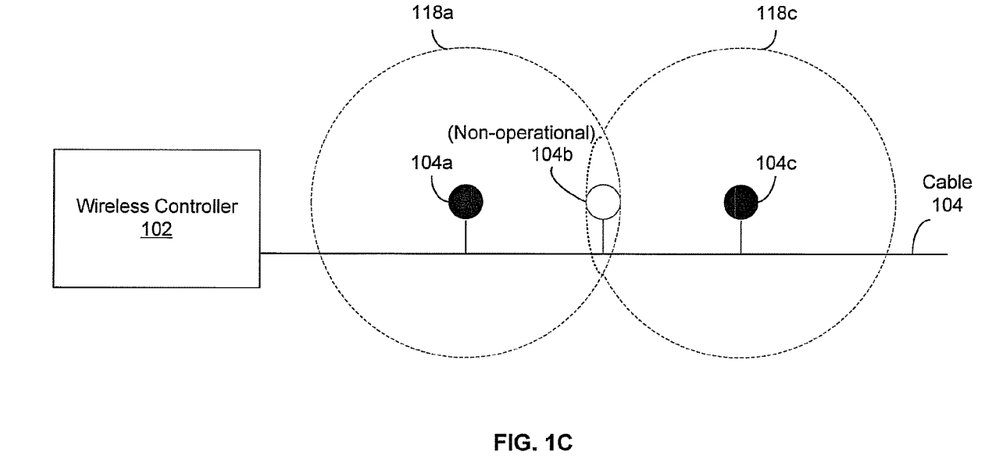

FIGS. 1B-1C are block diagrams that each illustrates exemplary coverage of wireless access point radios integrated in a cable, in accordance with an embodiment of the invention. These scenarios are provided by way of exemplary illustration and not of limitation. Referring to each of FIGS. 1B-1C, there is shown the wireless controller 102, the cable 104 and the wireless AP radios 104a-104c described above with respect to FIG. 1A. Each of the wireless AP radio 104a, 104b, 104c may be placed apart at a short distance such as, for example, at 1-3 meters, in the cable 104.

FIG. 1B illustrates a first exemplary scenario in which all the wireless AP radios 104a, 104b, 104c are operational. In such an instance, each of the wireless AP radios 104a, 104b, 104c may be operable to provide normal coverage without interfering with neighbors, as illustrated by coverage 116a, coverage 116b and coverage 116c. Each of the wireless AP radios 104a, 104b, 104c may provide the normal coverage based on a power level setting received or downloaded from the wireless controller 102 via the cable 104. The wireless AP radio 104a may monitor and/or verify the operation of the wireless AP radio 104b. The wireless AP radio 104b may monitor and/or verify the operations of the wireless AP radios 104a, 104c. The wireless AP radio 104c may monitor and/or verify the operation of the wireless AP radio 104b.

FIG. 1C illustrates a second exemplary scenario in which the wireless AP radios 104a, 104c are operational while the wireless AP radio 104b is detected to be non-operational or defective. In such an instance, each of the wireless AP radios 104a, 104c may receive an updated power level setting from the wireless controller 102. The wireless AP radio 104a may increase its transmission power, based on the received power level setting, to increase its coverage for covering a portion of coverage area associated with the wireless AP radio 104b, as illustrated by coverage 118a. The wireless AP radio 104c may increase its transmission power, based on the received power level setting, to increase its coverage for covering a portion of coverage area associated with the wireless AP radio 104b, as illustrated by coverage 118c. Accordingly, the coverage area associated with the non-operational or defective wireless AP radio 104b may be covered by the adjacent wireless AP radios 104a, 104c.

Figure 2:
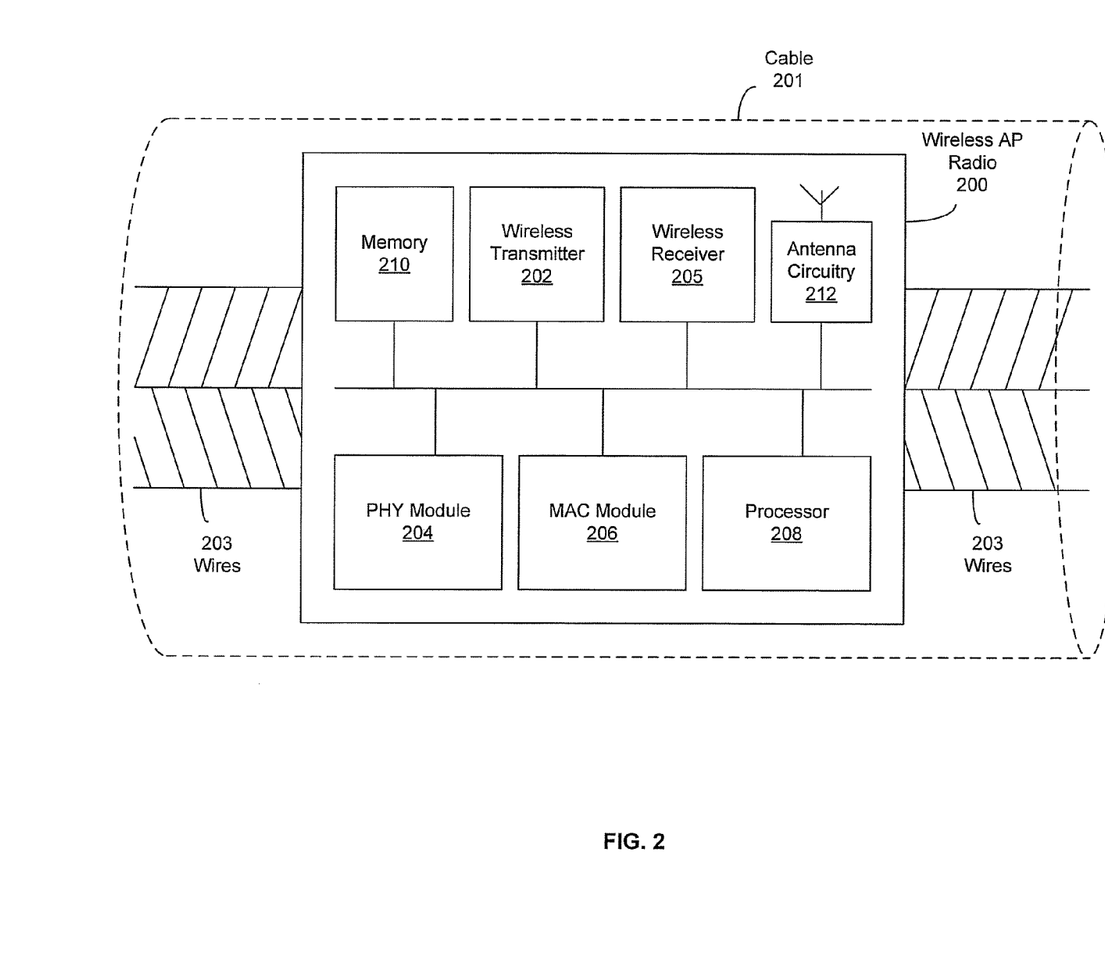
FIG. 2 is a block diagram illustrating an exemplary wireless access point radio integrated in a cable, in accordance with an embodiment of the invention.

FIG. 2 is a block diagram illustrating an exemplary wireless access point radio integrated in a cable, in accordance with an embodiment of the invention. Referring to FIG. 2, there is shown a wireless AP radio 200 integrated in a cable 201. The wireless radio 200 may comprise a wireless transmitter 202, a wireless receiver 205, 205, a PHY module 204, a MAC module 206, a processor 208, a memory and an antenna circuitry 212. The cable 201 may comprise wires 203. The wireless AP radio 200 may be substantially similar to, for example, the wireless AP radio 104a in FIG. 1A. The cable 201 may be substantially similar to, for example, the cable 104 in FIG. 1A.

The wires 203, which may be, for example, a pair of copper wires, may provide a medium for connecting the wireless AP radio 200 with other wireless AP radios integrated in the cable 201. The wires 203 may provide the wireless AP radio 200 with a shared medium for receiving a low voltage DC power from a wireless controller such as the wireless controller 102 as well as communicating data packets with the wireless controller 102 and/or other wireless AP radios integrated in the cable 201.

The wireless transmitter 202 may comprise suitable logic, circuitry, interfaces and/or code that may be operable to transmit radio signals based on one or more radio access standards such as, for example, WiFi, Bluetooth, ZigBee, picocell cellular and/or 60 GHz. The wireless transmitter 202 may communicatively coupled with the antenna circuitry 212. In an exemplary embodiment of the invention, the wireless transmitter 202 may communicate data packets with one or more client devices such as the client devices 110 via the antenna circuitry 212.

The wireless receiver 205 may comprise suitable logic, circuitry, interfaces and/or code that may be operable to receive radio signals based on one or more radio access standards such as, for example, WiFi, Bluetooth, ZigBee, picocell cellular and/or 60 GHz. The wireless receiver 205 may communicatively coupled with the antenna circuitry 212. In an exemplary embodiment of the invention, the wireless receiver 205 may communicate data packets with one or more client devices such as the client devices 110 via the antenna circuitry 212.

The PHY module 204 may comprise suitable logic, circuitry, interfaces and/or code that may be operable to implement the operability and/or functionality of layer 1 or physical layer of open systems interconnection (OSI) network model. The PHY module 204 may be operable to handle physical layer requirements, which may comprise, but are not limited to, packetization, data transfer and/or serialization/deserialization (SERDES), in instances where such an operation is required. In an exemplary embodiment of the invention, the PHY module 204 may encode data packets that are to be transmitted to the wireless controller 102 via the wires 203 and/or to decode data packets received from the wireless controller 102 via the wires 203.

The MAC module 206 may comprise suitable logic, circuitry, interfaces and/or code that may be operable to implement the operability and/or functionality of layer 2 or data link layer of OSI network model. The MAC module 206 may communicate with the PHY module 204 via parallel and/or serial links, for example. The MAC module 206 may provide addressing and channel access control mechanisms. In an exemplary embodiment of the invention, a MAC address provided by the MAC module 206 may be utilized by a wireless controller such as the wireless controller 102 for discovering or identifying the wireless AP radio 200 integrated in the cable 201.

The processor 208 may comprise suitable logic, circuitry, interfaces and/or code that may be operable to manage and/or control operations of various components in the wireless AP radio 200 such as, for example, the wireless transmitter 202, the wireless receiver 205, the antenna circuitry 212, the PHY module 204 and/or the MAC module 206. The processor 208 may process signals associated with the wireless transmitter 202, the wireless receiver 205, the PHY module 204 and/or the MAC modules 206. In an exemplary embodiment of the invention, the processor 208 may be operable to monitor and/or verify operations of one or more adjacent wireless AP radios which are integrated in the cable 210 and connected to the wires 203.

The memory 210 may comprise suitable logic, circuitry, interfaces and/or code that may be operable to store information such as executable instructions and/or data that may be utilized by the processor 208. The memory 210 may comprise RAM and/or ROM. In an exemplary embodiment of the invention, after the wireless AP radio 200 receives power from a wireless controller such as the wireless controller 102 via the wires 203, the memory 210 may be operable to store feature information and configuration parameters settings which may be downloaded from the wireless controller controller 102 via the PHY module 204 and the wires 203. The memory 210 may also store upgraded feature information and updated configuration parameter settings which may be received from the wireless controller 102 via the PHY module 204 and the wires 203. In an exemplary embodiment of the invention, the memory 210 may comprise volatile storage. Accordingly, after the wireless AP radio 200 is powered down, the feature information stored in the volatile storage may be lost and the configuration parameter settings stored in the volatile storage may be reset to default settings, for example.

The antenna circuitry 212 may comprise suitable logic, circuitry, interfaces and/or code that may be operable to provide antenna functionality for the wireless AP radio 200. The antenna circuitry 212 may communicatively coupled with the wireless transmitter 202 and/or the wireless receiver 205. The antenna circuitry 212 may comprise, for example a fractal antenna, a PCB antenna, and/or a dipole antenna. The transmission power of the antenna circuitry 212 may be managed and controlled by the processor 208.

In operation, the wireless AP radio 200 may receive power such as low voltage DC power, via the wires 203 from a wireless controller such as the wireless controller 102. The wireless AP radio 200 may receive feature information and/or configuration parameter settings, via the PHY module 204 and the wires 203, from the wireless controller 102. The received feature information and/or the received configuration parameter settings may be stored in the memory 210 for the processor 208 to use. The processor 208 may be operable to communicate data packets such as 802.11 data packets with one or more client devices such as the client devices 110 via the wireless transmitter 202, the wireless receiver 205 and the antenna circuitry 212. The processor 208 may be operable to communicate data packets such as 802.11 data packets with the wireless controller 102 via the PHY module 204 and the wires 203. The wireless AP radio 200 may also receive upgraded feature information and/or updated configuration parameter settings from the wireless controller 102 via the wires 203 and the PHY module 204. The wireless controller 102 may discover or identify the wireless AP radio 200 based on a MAC address provided by the MAC module 206.

The processor 208 may be operable to monitor and/or verify operations of one or more adjacent wireless AP radios integrated in the cable 201 and connected to the wires 203. In instances when one or more adjacent wireless AP radios may be detected to be non-operational or defective, the processor 208 may manage and/or control the increase of the transmission power of the antenna circuitry 212 based on a new or updated power level setting received via the PHY module 204 and the wires 203. The increased transmission power of the antenna circuitry 212 may increase coverage of the wireless AP radio 200 so as to cover at least a portion of coverage area associated with the one or more non-operational adjacent wireless AP radios.

Figure 3:
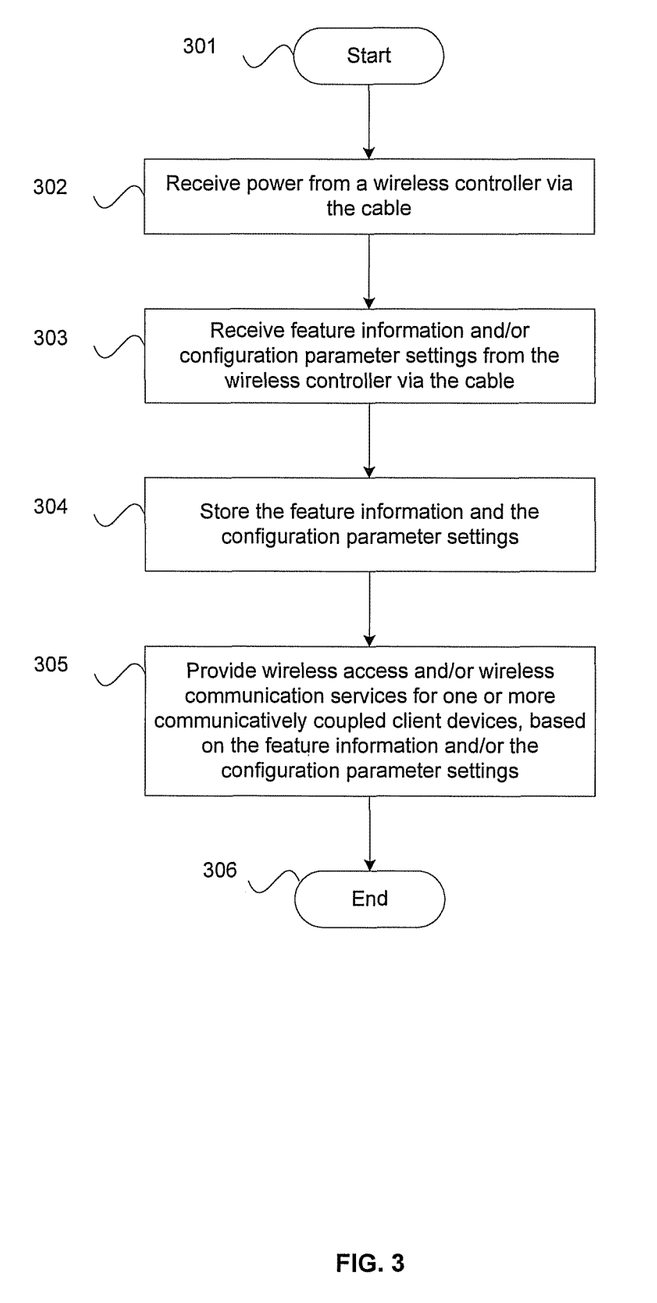
FIG. 3 is a flow chart illustrating exemplary steps for providing wireless access point radios integrated in a cable, in accordance with an embodiment of the invention.

FIG. 3 is a flow chart illustrating exemplary steps for providing wireless access point radios integrated in a cable, in accordance with an embodiment of the invention. Referring to FIG. 3, the exemplary steps start at step 301. In step 302, the wireless AP radio 200, which is integrated in the cable 201, may be operable to receiver power such as low voltage DC power from a wireless controller such as the wireless controller 102 via the cable 201. The power may be received via the wires 203. In step 303, the wireless AP radio 200 may receive feature information and/or configuration parameter settings from the wireless controller 102 via the cable 201. The feature information and/or the configuration parameter settings may be received via the wires 203 in the cable 201 and the PHY module 204 in the wireless AP radio 200. In step 304, the received feature information and the configuration parameter settings may be stored in the memory 210 in the wireless AP radio 200. In step 305, the wireless AP radio 200 may provide wireless access and/or wireless communication services for one or more communicatively coupled client devices such as the devices 110, based on the feature information and/or the configuration parameter settings. The wireless AP radio 200 may communicate with the client devices 100 via the wireless transmitter 202, the wireless receiver 205 and the antenna circuitry 212 in the wireless AP radio 200. The exemplary steps may proceed to the end step 306.

Figure 4:
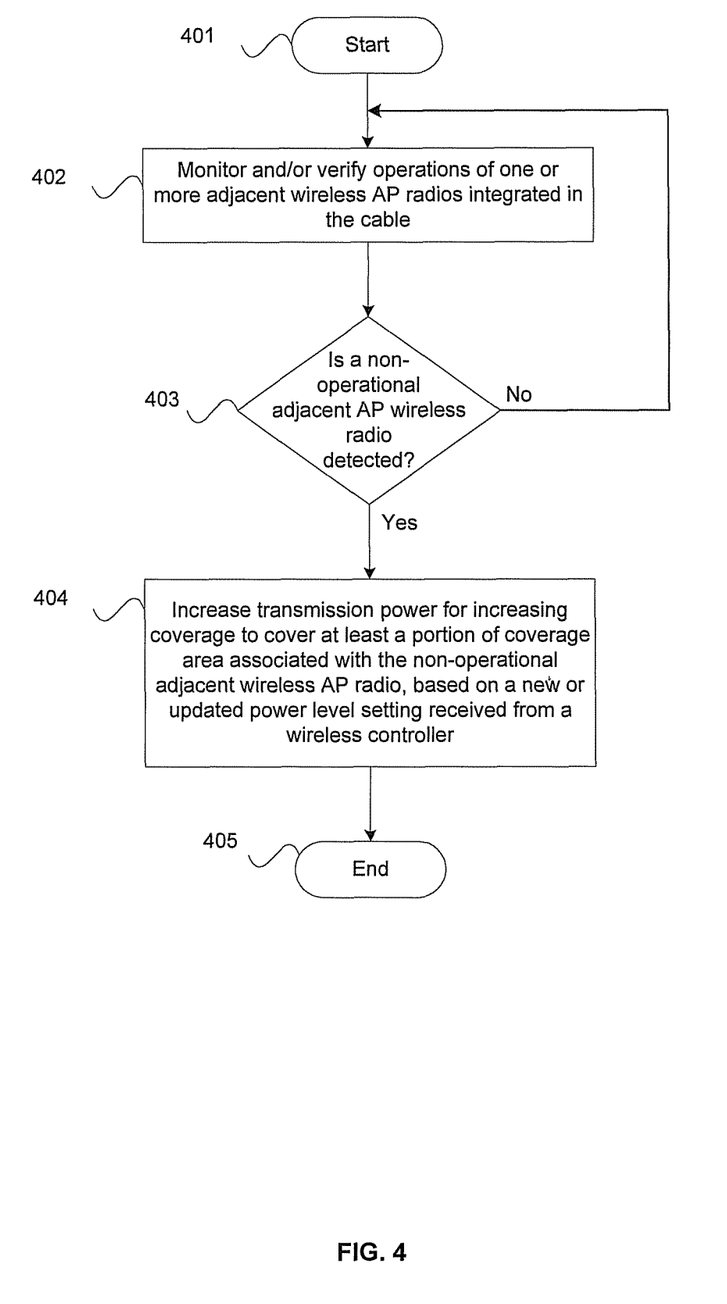
FIG. 4 is a flow chart illustrating exemplary steps for providing self healing utilizing wireless access point radios integrated in a cable, in accordance with an embodiment of the invention.

FIG. 4 is a flow chart illustrating exemplary steps for providing self healing utilizing wireless access point radios integrated in a cable, in accordance with an embodiment of the invention. Referring to FIG. 4, the exemplary steps start at step 401. 401. In step 402, the processor 208 in the wireless AP radio 200 integrated in the cable 201 may be operable to monitor and/or verify operations of one or more adjacent wireless AP radios integrated in the cable 201. In step 403, the detection of a non-operational or defective adjacent wireless AP radio is checked. In instances when a non-operational adjacent wireless AP radio is detected, the exemplary steps may proceed to step 404. In step 404, the transmission power of the antenna circuitry 212 in the wireless AP radio 200 may be increased for increasing coverage to cover at least a portion of coverage area associated with the non-operational adjacent wireless AP radio. The increase in the transmission power may be based on a new or updated power level setting received from a wireless controller such as the wireless controller 102. The exemplary steps may proceed to the end step 405. In step 403, in instances when none of the one or more adjacent wireless AP radios is detected to be non-operational; the exemplary steps may proceed to step 402.

In various embodiments of the invention, a wireless AP radio 104a may be integrated in a cable 104 and the cable 104 may comprise one or more other integrated wireless AP radios 104b, 104c sharing the cable 104. The cable 104 may be communicatively coupled or connected to a wireless controller 102. The wireless AP radio 104a may receive power such as low voltage DC power from the wireless controller 102 via the cable 201. Feature information and/or configuration parameter settings may be received by the wireless AP radio 104a from the wireless controller 102 via the cable 104. The wireless AP radio 104a may be operable to provide wireless access and/or wireless communication services for one or more client devices 110 that are communicatively coupled to the wireless AP radio 104a, based on the received feature information and/or the received configuration parameter settings. In this regard, the wireless AP radio 104a may provide the wireless access and/or wireless communication services using IEEE 802.11 standards, for example. The configuration parameter settings may comprise, for example, power level setting, channel setting, security setting and/or other configurable parameter settings.

In an exemplary embodiment of the invention, the wireless AP radio 104a may provide access to a wired network 101 for the one or more client devices 110. The wired network 101 may be communicatively coupled or connected to the wireless controller 102. In such instances, the wireless AP radio 104 may receive a data packet having a wireless format such as a 802.11 format from each of the one or more client devices 110 such as the client device 110a, and transmit the data packet having the wireless format to the wireless controller 102 via the cable 104. The wireless controller 102 may convert the received data packet having the wireless format such as the 802.11 format to generate a data packet having a wired format such as a 802.3 format for transmitting to the wired network 101.

The wired network 101 may transmit a data packet having a wired format such as the 802.3 format to the wireless controller 102. The wireless controller 102 may convert the received data packet having the wired format to generate a data packet having a wireless format such as the 802.11 format. The wireless controller 102 may transmit the data packet having the wireless format such as the 802.11 format to the wireless AP radio 104a via the cable 104. The wireless AP radio 104a may then transmit the received data packet having the wireless format such as the 802.11 format to each of the one or more client devices 110.

In an exemplary embodiment of the invention, the wireless controller 102 may discover or identify the wireless AP radio 104a integrated in the cable 104 based on a unique MAC address of the wireless AP radio 104a. Upgraded feature information and/or updated configuration parameter settings may also be received by the wireless AP radio 104a from the wireless controller 102 via the cable 104. The wireless AP radio 104a may be operable to monitor and/or verify operations of one or more adjacent wireless AP radios such as the wireless AP radio 104b integrated in the cable 104. In instances when one or more adjacent wireless AP radios such as the wireless AP radio 104b may be detected to be non-operational or defective, the wireless AP radio 104a may be instructed by the wireless controller 102 to increase its transmission power to increase its coverage for covering at least a portion of coverage area associated with the one or more non-operational adjacent wireless AP radios such as the wireless AP radio, 104b.

One or more new cables, such as the new cable 106, that each comprises one or more new wireless AP radios, such as the new wireless AP radios 106a-106b, may be added to the cable 104 so as to extend a total coverage area associated with the wireless AP radios 104a and the one or more other wireless AP radios 104b-104c in the cable 104.

In instances when the wireless AP radio 104a integrated in the cable 104 is defective, a section 104s of the cable 104 comprising the wireless AP radio 104a may be replaced by a new cable 108 comprising one or more new wireless AP radios, such as the new wireless AP radio 108a.

Other embodiments of the invention may provide a non-transitory computer readable medium and/or storage medium, and/or a non-transitory machine readable medium and/or storage medium, having stored thereon, a machine code and/or a computer program having, at least one code section executable by a machine and/or a computer, thereby causing the machine and/or computer to perform the steps as described herein for wireless access point radios integrated in a cable.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   in a wireless access point (AP) radio that is fully contained within a cable, wherein the cable contains one or more other wireless AP radios that are fully contained in the cable, and the cable is communicatively coupled to a wireless controller:
   receiving power by the wireless AP radio from the wireless controller via the cable by a direct connection within the cable;
   receiving feature information and configuration parameter settings by the wireless AP radio from the wireless controller via the cable by a direct connection within the cable;
   providing wireless access and wireless communication services by the wireless AP radio for one or more client devices that are communicatively coupled to the wireless AP radio based on the received feature information and the received configuration parameter settings; and
   when one or more adjacent wireless AP radios integrated in the cable become non-operational, increasing transmission power of the wireless AP radio to increase a coverage of the wireless AP radio to cover at least a portion of coverage area associated with the one or more adjacent wireless AP radios.

2. The method according to claim 1, comprising providing wireless access to a wired network which is connected to the wireless controller for the one or more client devices.

3. The method according to claim 2, comprising:
   receiving a data packet having a wireless format from each of the one or more client devices; and
   transmitting the data packet having the wireless format to the wireless controller via the cable by a direct connection within the cable, wherein the wireless controller converts the data packet having the wireless format to generate a data packet having a wired format for transmitting to the wired network.

4. The method according to claim 2, comprising:
   receiving a data packet having a wireless format from the wireless controller via the cable by a direct connection within the cable, wherein the wireless controller has converted a data packet having a wired format to generate the data packet having the wireless format after receiving the data packet having the wired format from the wired network; and
   transmitting the data packet having the wireless format to each of the one or more client devices.

5. The method according to claim 1, wherein the wireless controller identifies the wireless AP radio based on a media access control (MAC) address of the wireless AP radio.

6. The method according to claim 1, comprising monitoring and verifying operations of one or more adjacent wireless AP radios integrated in the cable by a direct connection within the cable.

7. The method according to claim 1, comprising supporting at least one Wireless Local Area Network (WLAN) operating standard.

8. The method according to claim 1, comprising receiving upgraded feature information and updated configuration parameter settings from the wireless controller via the cable by a direct connection within the cable.

9. The method according to claim 1, wherein one or more new cables that each comprises one or more new wireless AP radios are added to the cable to extend a total coverage area associated with the wireless AP radio and the one or more other wireless AP radios in the cable.

10. The method according to claim 1, wherein, when the wireless AP radio integrated in the cable is defective, a section of the cable comprising the wireless AP radio is replaced by a new cable comprising one or more new wireless AP radios.

11. A system for communication, the system comprising:
    one or more processors and circuits for use in a wireless access point (AP) radio that is fully contained within a cable, wherein the cable comprises one or more other integrated wireless AP radios that are fully contained within the cable, the cable is communicatively coupled to a wireless controller, and the one or more processors and circuits are configured to:
    receive power from the wireless controller via the cable by a direct connection within the cable;
    receive feature information and configuration parameter settings from the wireless controller via the cable by a direct connection within the cable;
    provide wireless access and wireless communication services for one or more client devices that are communicatively coupled to the wireless AP radio based on the received feature information and the received configuration parameter settings; and
    when one or more adjacent wireless AP radios integrated in the cable become non-operational, increase transmission power of the wireless AP radio to increase a coverage of the wireless AP radio to cover at least a portion of coverage area associated with the one or more non-operational adjacent wireless AP radios.

12. The system according to claim 11, wherein the one or more processors and circuits are operable to provide wireless access to a wired network which is connected to the wireless controller for the one or more client devices.

13. The system according to claim 12, wherein the one or more processors and circuits are operable to:
    receive a data packet having a wireless format from each of the one or more client devices; and
    transmit the data packet having the wireless format to the wireless controller via the cable by a direct connection within the cable, and the wireless controller converts the data packet having the wireless format to generate a data packet having a wired format for transmitting to the wired network by a direct connection within the cable.

14. The system according to claim 12, wherein the one or more processors and circuits are operable to:
    receive a data packet having a wireless format from the wireless controller via the cable by a direct connection within the cable, and the wireless controller has converted a data packet having a wired format to generate the data packet having the wireless format after receiving the data packet having the wired format from the wired network; and
    transmit said data packet having the wireless format to each of the one or more client devices.

15. The system according to claim 11, wherein the wireless controller identifies the wireless AP radio based on a media access control (MAC) address of the wireless AP radio.

16. The system according to claim 11, wherein the one or more processors and circuits are operable to monitor and verify operations of one or more adjacent wireless AP radios integrated in the cable by a direct connection within the cable.

17. The system according to claim 11, wherein, the one or more processors and circuits are further configured to support at least one Wireless Local Area Network (WLAN) operating standard.

18. The system according to claim 11, wherein the one or more processors and circuits are operable to receive upgraded feature information and updated configuration parameter settings from the wireless controller via said cable.

19. The system according to claim 11, wherein one or more new cables that each comprises one or more new wireless AP radios are added to the cable to extend a total coverage area associated with the wireless AP radio and the one or more other wireless AP radios in the cable.

20. The system according to claim 11, wherein, when the wireless AP radio integrated in the cable is defective, a section of the cable comprising the wireless AP radio is replaced by a new cable comprising one or more new wireless AP radios.

* * * * *